United States Patent [19]

Halase, III et al.

[11] 4,053,742
[45] Oct. 11, 1977

[54] ENERGY MEASURING SYSTEMS ADAPTED FOR USE IN CONJUNCTION WITH LOAD MOVING AND WEIGHT INDICATING DEVICES

[75] Inventors: John F. Halase, III, Boardman Township; Homer P. Halsey, Poland Township, both of Mahoning County, Ohio; Robert L. Troup, Highland, Ind.

[73] Assignee: Youngstown Sheet and Tube Company, Youngstown, Ohio

[21] Appl. No.: 752,564

[22] Filed: Dec. 20, 1976

[51] Int. Cl.² .................... B66B 19/00; G01R 21/00; G06G 7/48
[52] U.S. Cl. .................................. 364/506; 364/567

[58] Field of Search ........... 235/151.3, 151.33, 151.31, 235/151.21; 177/136; 324/71 R, 76 R; 104/151, 174; 214/55, 700

[56] References Cited

U.S. PATENT DOCUMENTS

| | | | |
|---|---|---|---|
| 3,225,180 | 12/1965 | Zorena et al. | 235/151.33 |
| 3,934,126 | 1/1976 | Zalesov et al. | 235/150.2 |
| 3,965,733 | 6/1976 | Hutchings et al. | 235/151.33 X |

Primary Examiner—Edward J. Wise
Attorney, Agent, or Firm—John Stelmah

[57] ABSTRACT

Energy measuring systems particularly adapted for use in conjunction with load moving devices which comprise apparatus for measuring and providing an indication of the energy expended in moving a load, and for converting a signal corresponding to such energy to a signal corresponding to the weight of the load.

8 Claims, 4 Drawing Figures

ENERGY MEASURING SYSTEMS ADAPTED FOR USE IN CONJUNCTION WITH LOAD MOVING AND WEIGHT INDICATING DEVICES

BACKGROUND OF THE INVENTION

This invention relates generally to energy measuring systems. More particularly, this invention relates to energy measuring systems particularly adapted for use in conjunction with devices which include movable load supporting means (such as material transfer cars, crane hooks, block and tackle, and the like), motor driving means, connecting means (cable line) connecting the motor means to the load supporting means, and improved apparatus for measuring the energy expended in moving a load and translating the measurement into a signal corresponding to the weight of the load. The invention is particularly adapted for use in skip car hoisting systems used in conjunction with and for feeding of blast furnaces and hence the invention will be described in detail in connection with such systems.

DESCRIPTION OF PRIOR ART

Blast furnace skip car arrangements that include weight measuring apparatus embodying electric motor power and velocity translation means are known in the art. An exemplary system is disclosed in U.S. Pat. No 3,225,180. There is disclosed skip car apparatus including means for simultaneously measuring the amperage, voltage, and velocity of the motor means driving a drum around which the lifting cable is wound and for converting these measurements into an electric signal; means for automatically introducing these signals into a computer when the car is being hoisted and the motor means is operating at a substantially constant speed; and analog computer means for determining the weight of the load in the car in accordance with a prescribed formula.

Inherent disadvantages of such system are the necessity for monitoring motor velocity and that it relies upon the motor means operating at a substantially constant speed. Even though the distance through which the skip car travels is constant, the time period during which the motor means is operating at a constant speed may vary with a change in load because of an attendant change in the initial inertia effect and in the braking action. Such system is also unreliable at some of the load ranges, particularly with great loads, because energy losses, such as those due to motor heating, are not taken into account in the weight determining formula. Additionally, such system is vulnerable to electrical "noise" which leads to errors in calculations.

SUMMARY OF THE INVENTION

The instant invention provides for the measurement of the motor current and voltage over the entire lifting cycle, or a given portion thereof, in a material load handling mechanism, irrespective of the speed of the load. Through the integration of the proper combination of the motor current and voltage, a signal representative of the energy expended in moving a load support (skip car) and the load thereon (iron ore, limestone, coke) is obtained. The signal is independent of effects which might otherwise be manifested because of load support acceleration and/or deceleration. Measurement of the current flowing through the armature of a DC motor is made to avoid inclusion of extraneous currents in the motor circuit. The signal representative of the energy expended in moving the load may be converted to a weight representative signal which in turn may be used to provide a direct readout of the load weight.

DESCRIPTION OF PREFERRED EMBODIMENTS

Figure 1:
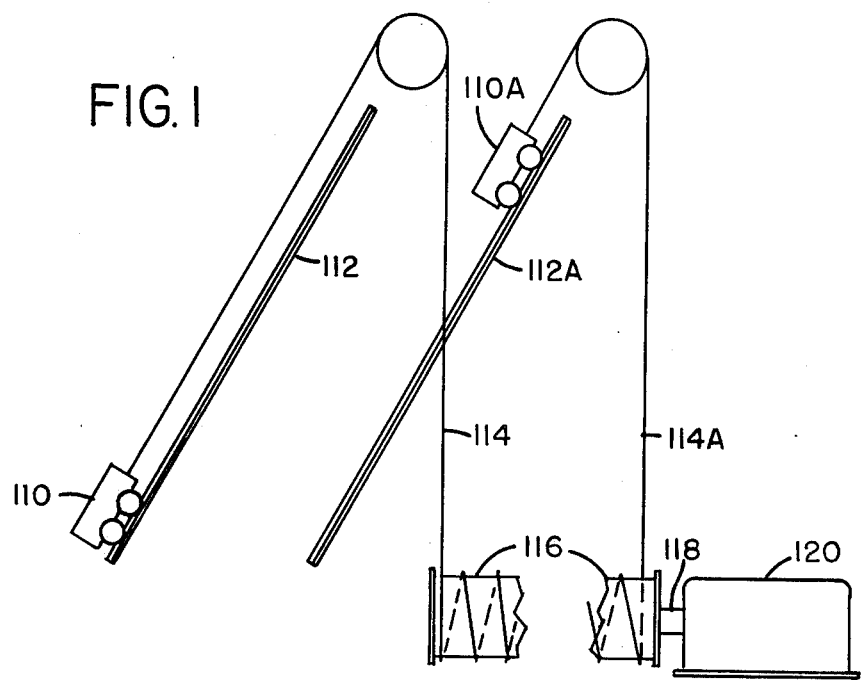
FIG. 1 is a schematic illustration of a skip-hoisting system.

In FIG. 1, there is schematically illustrated a typical skip car 110 riding on tracks 112, which may lead to the top of a blast furnace (not shown). The car 110 is connected to a cable 114 windable about revolvable drum 116. The drum 116 is driven through shaft 118 by electric motor means 120.

Optionally, and usually, two skip cars and two sets of tracks are provided. These additional apparatus are designated by corresponding numerals together with the letter suffix "A". An additional motor (not shown) may also be provided, coupled to motor 120.

If the drum 116 is rotated in a first direction, the skip car 110 A is elevated, as shown in FIG. 1 and car 110 descends. If the drum 116 is rotated in a direction counter to the first direction the skip car 110 is elevated and skip car 110 A descends.

Figure 2:
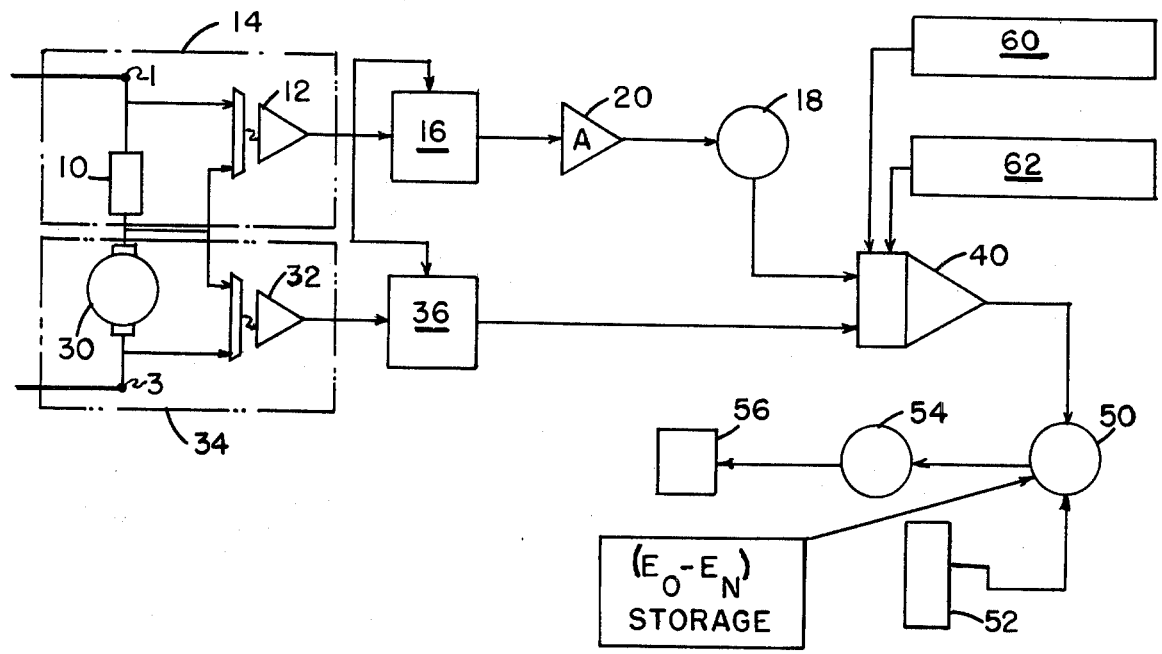
FIG. 2 is a schematic and block diagram of an embodiment of apparatus of this invention.

In FIG. 2 is shown a schematic and block diagram of the energy measuring circuitry of this invention useful for determining the weight of a lifted load. The shunt connection 10 and the isolation amplifier 12 comprise current measuring means 14. The voltage connection to armature 30 and isolation amplifier 32 comprise the voltage measuring means 34. Amplifier 12 provides an electrical signal which is proportional to the motor armature current $I_a$ and amplifier 32 provides an electrical signal which is proportioned to the voltage V across the armature of the motor M.

It is important that the shunt connection 10 be connected in series with the motor armature and in a manner such that the armature current is the only current flowing through the shunt or in a manner that the armature current is segregated from other currents associated with the motor circuitry.

A multiplier device 16 provides a signal which is proportional to and representative of the value of the square, $(I_a^2)$, of the motor current $I_a$. Device 18, which may be in the form of a potentiometer, multiplier, or other suitable means, is provided to convert the $I_a^2$ representative signal to a signal which corresponds to the product of the armature current $I_a^2$ times the armature resistance $R_a$ or $I_a^2 R_a$. An inverter 20 is also provided, either before or after the device 18 to convert the $I_a^2 R_a$ signal to a negative value or $-I_a^2 R_a$. The signal representative of $-I_a^2 R_a$ is then fed to integrator 40.

A multiplier device 36 provides a signal which is proportional to and representative of the product of the armature voltage V times the motor current $I_a$ or $I_a V$ and this signal is transmitted to the integrator 40.

The output of integrator 40 is a voltage signal proportional to and representative of the energy $E_S$ required to lift the load supporting means, skip car, and its contents. This signal is transmitted to conventional subtraction device 50 into which there is also introduced a signal $E_L$ generated by conventional adjustable generating means 52, which may be in the form of a potentiometer. Device 50 subtracts the value of the signal $E_L$ from the value of the signal $E_S$. The signal voltage $E_L$ is proportional to and corresponds to the energy expended in moving an empty skip car, which can be determined by trial. The voltage resulting from the subtraction by device 50 corresponds to a proportional value of the energy required to lift the contents in the skip. A converter device 54, which may be in the form of a potentiometer is provided to convert the E signal to a voltage proportional to the skip content weight, W. In turn that voltage may be displayed by device 56 to provide a direct readout in pounds of the skip content weight W.

The duration of the integration time for integrator 40 is controlled by device 60, which may be in the form of semi-conductor switches or a relay logic system. The integration time corresponds to the time required for the skip to be elevated from the starting position to the top of the incline. Device 62 is provided to reset the integrator 40 after a time delay.

If more than one hoist motor is used in an operation, all of the devices of the circuit leading up to the integrator 40 would be duplicated for each additional motor. The signals from the additional devices corresponding to devices 18, or 20, and 36 would provide additional inputs to integrator 40.

The weight W of the skip's contents may be expressed as $$W = K \int_0^{t_f} (I_a V - I_a^2 R_a) dt - K_L E_L$$

which is derived as follows.

The torque T developed by the lifting DC motor is expressed by the equation $$T = K_1(I_a \phi) \tag{1}$$

where $I_a$ is the armature current and $\phi$ is the magnetic field in the motor.

The motor speed S may be related to $\phi$ by the equation $$S = K_2\left(\frac{V - I_a R_a}{\phi}\right) \text{ or} \tag{2}$$

$$\phi = K_2\left(\frac{V - I_a R_a}{S}\right)$$

where V is the voltage across the armature and $R_a$ is the armature resistance. Hence, substituting for $\phi$ in equation (1), $$T = \frac{K_1 K_2 I_a (V - I_a R_a)}{S} \tag{3}$$

The motor instanteous speed is proportional to the time derivative of the distance L traveled by the skip car, or $$S = K(dx)/3dt \tag{4}$$

Substituting for S in equation (3);

$$T = \frac{K_o I_a(V - I_a R_a)}{dx/dt} \tag{5}$$

where $K_o = (K_1 K_2/K_3)$
By rearranging equation (5), $$T \, dx = K_o(I_a V - I_a^2 R_a) \, dt \tag{6}$$

The motor torque is proportional to tension resultant force F exerted on the lifting cable, or $$T = L_4 F \tag{7}$$

Integration of the force F with respect to the distance L which the skip car travels from the bottom of the incline to the stopping point at the top ot the incline is expressed as $$\int_0^L K_4 F \, dx = \int_0^L T \, dx \tag{8}$$

$$K_4 F L = \int_0^L T \, dx \tag{9}$$

Force F times distance L is work Y, thus $$K_4 Y = \int_0^L T \, dx \tag{10}$$

Since work Y and energy E are of the same units, the energy $E_S$ required to lift the loaded skip car may be expressed as $$K_5 E_S = \int_0^L T \, dx \tag{11}$$

Integration of the equation (6) yields $$\int_0^L T \, dx = \int_0^{t_f} K_o(I_a V - I_a^2 R_a) \, dt \tag{12}$$

Substitution in equation (11) yields $$E_S = K_6 \int_0^{t_f} (I_a V - I_a^2 R_a) \, dt \tag{13}$$

when
$$K_6 = (K_o/K_5)$$

Equation (13) relates the electrical parameters of the DC hoisting motor with the energy expended by the motor in lifting the skip car and its contents. As a skip is lifted, the electrical energy expended by the motor is representative of the various forms of energy changes which occur. Part of the energy is in the form of kinetic energy associated with the moving skip; part is that expended in overcoming windage and mechanical friction forces, and electrical heating losses within the motor; and a substantial part is that required to lift the contents of the skip (increase in potential energy). The weight attributable to skip car 110 is substantially balanced by the weight of skip car 110.A. Thus the electrical energy expended corresponding to the potential energy change is attributable primarily to lifting the contents of the skip car. Provision is made in the circuitry for automatically subtracting a voltage value representing the energy (corresponding to the $I_aV$ term) associated with the generator action of the motor. Provision is also made for subtracting a voltage signal corresponding to $I_a^2R_a$. As a result, the calculated $E_S$ voltage is essentially linearly related to the change in the potential energy due to the skip's contents being moved to the top of the incline.

$E_L$ is used to designate the energy necessary to overcome forces attributable to windage, friction, etc. The $E_L$ energy forces may be subtracted from the total energy forces $$E = E_S - E_L \tag{14}$$

Thus, the circuit output voltage $E$ may be related only to the change in potential energy of the skip's contents or, $$E = K_7 Wh \tag{15}$$

where $W$ is the weight of the skip's contents and $h$ is the height that the contents are lifted. Since the height $h$ is constant the terms $K_7 h$ may be represented by a new constant $K_8$; thus $$E = K_8 W \tag{16}$$

substitution of the $E_S$ value of equation (13) in equation (14) yields $$E = K_6 \int_0^{t_f} (I_a V - I_a^2 R_a) \, dt - E_L \tag{17}$$

The combination of equations (16) and (17) produces $$W = \frac{K_6}{K_8} \int_0^{t_f} (I_a V - I_a^2 R_a) \, dt - \frac{E_L}{K_8} \tag{18}$$

Accordingly, the weight of the skip's contents may be expressed as:

$$W = K \int_0^{t_f} (I_a V - I_a^2 R_a) \, dt - K_L E_L \tag{19}$$

when $K = (K^6/K_8)$ and $K_L = (1/K_8)$. The actual values for K and $K_L$ are determined empirically.

The original equation for conversion from volts to weight is of the form:

$$W = KV_{int} - K_L E_L$$

where $$V_{int} = \int_0^{t_f} (I_a V - I_a^2 R) \, dt.$$

Figure 4:
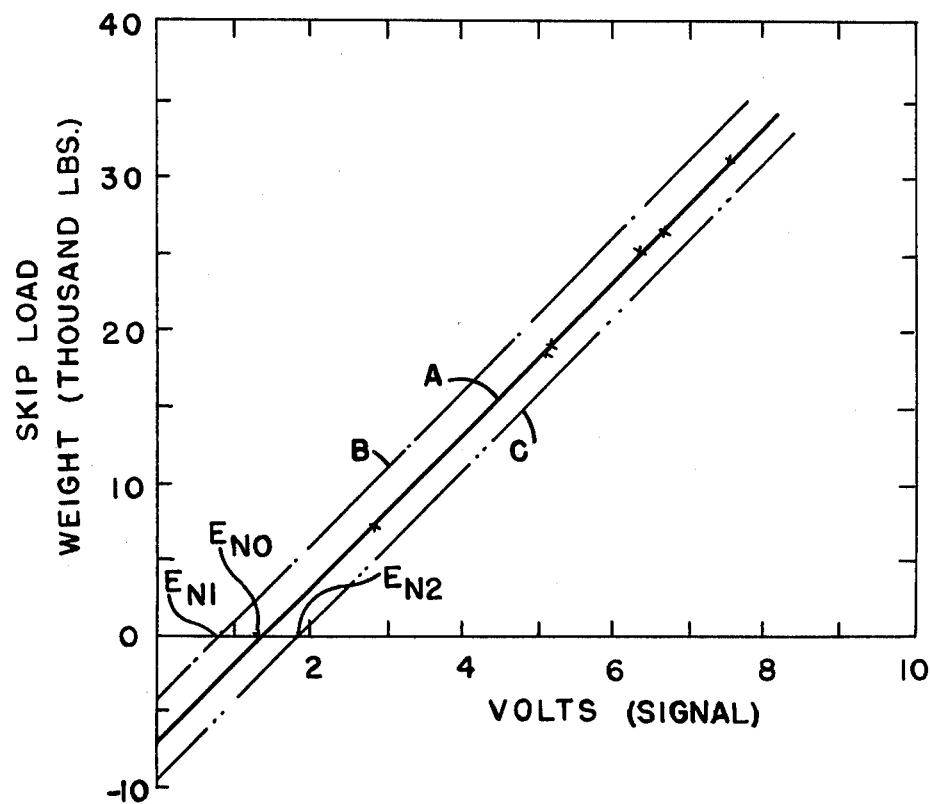
FIG. 4 is a graph developed from data determined from a skip hoisting system, which graph shows the load weight in pounds represented by the voltage signal units generated.

The graph in FIG. 4 is representative of data collected for corresponding values of $V_{int}$ and known skip load weights. The line "A" results from a "best fit" line through the data points. The values for K and $K_L E_L$ can be determined from the slope and weight intercept values of the graph. (Separate K and $K_L E_L$ values are determined for each skip.)

To determine the actual energy to weight conversion factor, constant K, skip loads of various known weights are lifted to the top of the incline and the output voltage of the integrator 40 is monitored. The generated voltage signal values representative of energy are plotted versus the weights to produce a graph similar to that shown in FIG. 4. The slope of the developed line "A" (pounds/volt) is used to obtain the K value, which in FIG. 4 is 4928 pounds/volt. Potentiometer 54 is adjusted to represent this value. The K value for a given system will remain essentially the same. However, the position of the line in respect to the abcissa may rise or fall depending upon the characteristics of the system that may change from time to time, i.e., windage friction losses, difference in weight of the skips. The automatic compensation feature corrects for these changes.

The value for $K_L E_L$ is represented by the intercept of the line with the ordinate, which in the case depicted in FIG. 4 (line "A") corresponds to $-6751$ pounds.

The automatic compensation feature requires an addition to the original equation of:

$$+ K(E_o - E_N)$$

resulting in a new equation:

$$W = \int_0^{t_f} (I_a V - I_a^2 V) \, dt + K(E_o - E_N) - K_L E_L$$

or $$W = KV_{int} - K_L E_L + K(E_o - E_N)$$

The K $(E_o - E_N)$ term compensates for changes of the energy required to lift the empty skip. $E_o$ is the voltage corresponding to the energy required to lift an empty skip when initially measured. $E_N$ is the (new) voltage resulting from an empty skip being sent to the top of the incline at some given time after the initial measurement was taken. The compensating term has the effect of producing a change in the voltage to weight equation's intercept. On the graph $E_{N1}$ corresponds to a decrease in the empty skip weight, and $E_{N2}$ relates to an increase in the empty skip weight. These apparent changes in the empty skip weight are due to variations in the skip hoist lifting devices. The lines B and C on the graph indicate the resulting lines when the corresponding $E_N$ values are inserted into the K $(E_o - E_N)$ term. For example $E_{N2}$ (line C) indicates that the weight intercept is more negative indicating that more weight should be subtracted to compensate for an increase in the empty skip lifting energy. Conversely, $E_{N1}$ (line B) indicates that the weight intercept is more positive indicating that less weight should be subtracted to compensate for the decrease in the empty skip lifting energy.

In practice the value for $(E_o - E_N)$ is stored in the weighing system's circuitry. Initially $E_N$ equals $E_o$ and the compensation term equals zero. Once the system is in operation, empty skips are sent to the top of the furnace periodically. The lifting energy for empty skips is sensed and the corresponding $E_N$ voltage is incorporated in the equation. Every subsequent skip load weight is computed based on the compensated equation. Each empty skip elevating run automatically generates a new equation which is related to the original empirical equation by the K ($E_o - E_N$) term.

Design of the electronics which calculates the energy required to lift the skip and its contents is based on the known operating parameters of the hoist motor circuit and physical limitations of the circuit components used. The principals disclosed above in conjunction with DC motors can also be applied in systems using AC motors; however, it will be apparent that some modifications will be required in the electrical circuitry.

The maximum motor voltage and current values for the skip hoist motors can be determined by measurement during the skip lifting period. The choice of current shunt is based on the maximum anticipated motor current draw (with some arbitrary safety factor included). An example of one system which was developed will now be described. A 1000 ampere shunt was selected to develop a 50 millivolt signal at rated current. Isolation amplifiers 12 and 32 which exhibit linear gain up to a maximum output voltage of ± 10 volts were selected. The gains of the amplifiers were selected to provide no greater than 10 volts output at the anticipated maximum input voltage. The amplifier 12 selected has a maximum input voltage of 50 millivolts. Therefore, a gain of 200 was chosen, i.e., (0.050 volts) (200) = 10 volts. The output voltage of amplifier 12 is proportional to $I_a/100$. The maximum measured armature voltage, V, is 250 volts. The gain of amplifier 32 was selected to provide an output voltage proportional to V/100 for reasons to be explained.

Devices 16 and 36 are multiplier devices which generate an output voltage equal to the product of their inputs divided by ten or $V_{out} = (V_{in})_x(V_{in})_y/10$. Therefore the output of device 16 equals $I_a^2/100,000$. At maximum motor current (1000 amperes) 10 volts is present at the device 16 output. The inputs to device 36 and $I_a/100$ and V/100 which yield a voltage equal to $I_aV/100,000$ at the output. Scaling the gain of amplifier 32 provides a V/100 signal equal to 2.5 volts at maximum armature voltage. Consequently, the denominators of both multiplier outputs are equal. Inverter 20 simply changes the sign of $I_a^2/100,000$ to $-I_a^2/100,000$.

Typically, the armature resistance, $R_a$, of a large DC motor is less than 1 ohm. As a result, the electronic component used to multiply the motor current times armature resistance is only required to provide multiplication by numbers less than 1. A potentiometer (or resistive divider) device 18 serves this function. In this example, $R_a$ is equal to 0.05 ohms and device 18 adjusted to give 0.5 volts output for a 10 volt input (multiplication by 0.05).

The inputs to integrator 40 are voltages proportinal to $-(0.05) (I_a)^2/100,000$ yielding a maximum voltage of $-0.5$ volts, and $I_aV/100,000$ resulting in a maximum possible voltage of 2.5 volts. Integrator 40 generates an output related to the time integral of the difference of its input voltages. The maximum time that is required for a skip to be lifted to the top of the blast furnace is measured to determine the maximum integrating duration ($t_o \leq t \leq t_f$), of integrator 40. This time interval and the input voltages to integrator 40 determine the required gain factor. Assuming the maximum integration period to be 50 seconds and the maximum input voltage difference to be $2.0 = (2.5 - 0.5)$ volts, the gain factor, $K_6$, can be calculated to give a maximum integrator 40 output voltage of 10 volts. In this example $K_6$ equals a 0.1 gain factor.

Following is a more detailed description of the unique "extra energy" cancelling features of this invention.

Figure 3:
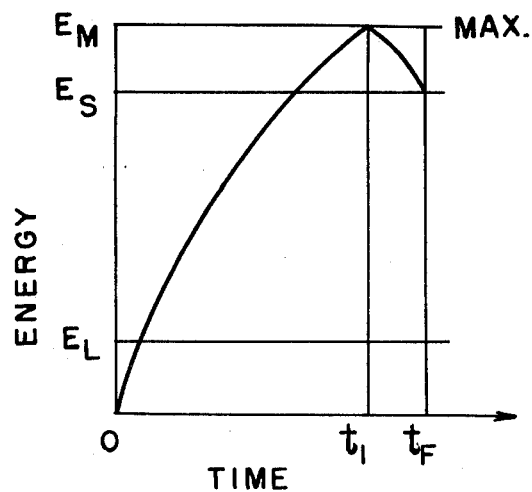
FIG. 3 is a diagrammatic representation of the change in energy consumption by an electric motor during a lifting and braking cycle.

There are four combinations of motor voltage and armature current which can occur as the skips are raised or lowered. Referring to the FIG. 2, the motor circuit is energized at points 1 and 3. The polarity of the impressed supply voltage across pts. 1 and 3 determines the direction of motor rotation. During the lifting period from $t_o$ to $t_l$ in FIG. 3, the motor current initially flows from the positive input voltage terminal to the negative input terminal. At time $t_l$ to $t_f$ when dynamic braking occurs the motor acts as a generator and the direction of current flow reverses. The change in direction of current causes a change in the polarity of voltage measured across device 10. No switching is required in the energy calculating circuit to accomplish this. The following table illustrates the four combinations of motor voltage and current. In case 1 point 1 is positive polarity with respect to point 3, the reverse polarity holds for case 2.

| Case | Motor Voltage | Armature Current | Time Period | Device 16 Output | Device 36 Output | Device 40 Input |
|---|---|---|---|---|---|---|
| 1x | +V | +$I_a$ | $o \leq t \leq t_l$ | $\alpha I_a^2$ | $\alpha I_aV$ | $\alpha(I_aV - I_a^2R_a)$ |
| 1y | +V | $-I_a$ | $t_l \leq t \leq t_f$ | $\alpha I_a^2$ | $\alpha -I_aV$ | $\alpha(-I_aV - I_a^2R_a)$ |
| 2x | $-V$ | $-I_a$ | $o \leq t \leq t_l$ | $\alpha I_a^2$ | $\alpha I_aV$ | $\alpha(I_aV - I_a^2R_a)$ |
| 2y | $-V$ | $+I_a$ | $t_l \leq t \leq t_f$ | $\alpha I_a^2$ | $\alpha -I_aV$ | $\alpha(-I_aV - I_a^2R_a)$ |

In the above table Case 1 and Case 2 represent rotation of the motor, forward and reverse. During time period $t_o$ to $t_1$ when the skip is being lifted, the inputs to device 40 are proportional to $I_aV - I_a^2R_a$ for both cases. The $I_a^2R_a$ term subtracts motor heating losses from the input power term, $I_aV$. From $t_1$ to $t_f$ the inputs to integrator 40 are proportional to $-I_aV - I_a^2R_a$. In this interval of lifting the skip is decelerated. The $I_aV$ term relates to the excess power of the system, i.e., power which was utilized in accelerating the skip faster than it was necessary to reach the top of the furnace. Exclusion of this power would result in "extra energy" in the total energy calculation. The $I_a^2R_a$ term for this second portion of the lifting period subtracts heating losses in the generator action of the motor. When computed over the entire lifting time $t_o$ to $t_f$, input to device 40 is proportional to $(I_aV - I_a^2R_a)_x + (-I_aV - I_a^2R_a)$ . Because the circuit inherently compensates for the sign changes of the $I_aV$ power term irrespective of motor rotational direction, the algorithm for the voltage present at the device 40 output is simply stated $\int_o^{t_f}(I_aV - I_a^2R_a) dt$ for the entire lifting interval.

What is claimed is:

1. A system comprising movable load-supporting means, motor driving means, and connecting means connecting said motor means to said load-supporting means, which further comprises apparatus for measuring the energy expended to move said load-supporting means and any load thereon from a first position to a second position, said apparatus comprising:
  a. means for measuring the motor armature current;
  b. means for measuring the voltage across the motor armature;
  c. first multiplier means for generating an electrical signal corresponding to the square of the motor current;
  d. inverter means for converting the polarity of the electrical signal from said multiplier means (c);
  e. second multiplier means for multiplying the signal from said inverter means (d) by the electrical resistance of the motor armature and generating a signal corresponding to the product thereof;
  f. third multiplier means for multiplying the motor armature current by the motor armature voltage and generating a signal corresponding to the product thereof; and
  g. integrating device means for integrating the signals from said second (e) and said third (f) multiplier means and producing a voltage corresponding to the energy required to move said load-supporting means and any load thereon.

2. A system as described in claim 1, wherein said apparatus further comprises
  h. indicia means for receiving the voltage from said integrating device (g) and converting said voltage to a signal indicative of the energy expended in moving said load-supporting means from a first position to a second position.

3. A system as described in claim 2, wherein said load-supporting means is elevatable and said system comprises apparatus for measuring the energy expended to elevate said load supporting means and any load thereon from a lower position to an elevated position, and wherein said indicia means (h) includes:
  j. means for translating the voltage from the integrating device (g) into a signal corresponding to the weight of said load-supporting means and any load thereon.

4. A system as described in claim 2, wherein said load-supporting means is elevatable and said system comprises apparatus for measuring the energy expended to elevate said load supporting means and any load thereon from a lower position to an elevated position and includes:
  k. subtracting means for subtracting a voltage corresponding to the energy required to lift said load-supporting means under no load condition from the voltage produced by integrating device (g) and thereby produce a remainder voltage for said indicia means (h) corresponding to the energy expended in lifting the load on said load-supporting means;
  l. means for translating said remainder voltage into a single corresponding to the weight of the load on said load-supporting means.

5. A system as described in claim 1, wherein said apparatus further comprises:
  i. subtracting means for subtracting a voltage corresponding to the energy required to move said load-supporting means under no load condition from the voltage produced by integrating device (g) and thereby produce a remainder voltage for said indicia means (h) corresponding to the energy expended in moving the load on said load-supporting means.

6. A system as described in claim 1, wherein:
said motor driving means is of the DC type 7. The system, including load carrying means, cable hoisting means for hoisting said load carrying means, a winding drum for said cable means, direct current motor means for driving said drum, and means for simultaneously measuring the voltage and current of said motor means; the improvement which comprises:
electrical circuit means for producing an output signal representative of the weight added to said load carrying means by measuring the energy required to raise said load carrying means with the added load from a lower position to a higher position in accordance with the formula $$W = K \int_{t_o}^{t_f} (I_a V - I_a^2 R_a)\, dt - K_L E_L$$

where $$\int_{t_o}^{t_f} (I_a V - I_a^2 R_a)\, dt$$

is energy consumption represented by a voltage signal, and
  $W$ = weight of added load (pounds)
  $I_a$ = motor current (amps)
  $V$ = motor voltage (volts)
  $R_a$ = armature resistance (ohms)
  $K$ = voltage signal representing pounds per voltage signal unit
  $E_L$ = voltage signal representative of energy expended in moving the load carrying means, and
  $K_L$ = is a constant to convert the $E_L$ value to weight.

8. A system as described in claim 7, wherein:
the term $K(E_o - E_N)$ is added to the formula and $E_o$ is the voltage corresponding to the energy required to lift the load carrying means determined by a first trial run and $E_N$ is the voltage corresponding to the energy required to lift the load carrying means as determined by a trial run subsequent to said first trial run.

* * * * *

UNITED STATES PATENT OFFICE
CERTIFICATE OF CORRECTION

Patent No. 4,053,742                    Dated October 11, 1977

Inventor(s) John F. Halase III; Homer P. Halsey; Robert L. Troup

It is certified that error appears in the above-identified patent and that said Letters Patent are hereby corrected as shown below:

Col. 4, Line 2, equation (4), "S = K(dx)/3dt" should read --$S = K_3 dx/dt$--, Col. 4, Line 18, equation (7), "$T = L_4 F$" should read --$T = K_4 F$--, Col. 8, Line 59, "$(-I_a V - I_a^2 R_a)$" should read --$(-I_a V - I_a^2 R_a)_y$--.

Signed and Sealed this

Second Day of May 1978

[SEAL]

Attest:

RUTH C. MASON
Attesting Officer

LUTRELLE F. PARKER
Acting Commissioner of Patents and Trademarks